United States Patent
Hong et al.

(10) Patent No.: US 10,798,723 B2
(45) Date of Patent: Oct. 6, 2020

(54) VEHICLE TO EVERYTHING COMMUNICATION CONTROL METHOD AND APPARATUS THEREFOR

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/075,593

(22) PCT Filed: Jan. 2, 2017

(86) PCT No.: PCT/KR2017/000025
§ 371 (c)(1),
(2) Date: Aug. 3, 2018

(87) PCT Pub. No.: WO2017/135580
PCT Pub. Date: Aug. 10, 2017

(65) Prior Publication Data
US 2019/0045521 A1    Feb. 7, 2019

(30) Foreign Application Priority Data

Feb. 4, 2016  (KR) .......... 10-2016-0014510
Dec. 20, 2016 (KR) .......... 10-2016-0175028

(51) Int. Cl.
*H04W 4/00* (2018.01)
*H04W 72/12* (2009.01)
(Continued)

(52) U.S. Cl.
CPC ......... *H04W 72/1205* (2013.01); *H04W 4/40* (2018.02); *H04W 8/24* (2013.01);
(Continued)

(58) Field of Classification Search
None
See application file for complete search history.

(56) References Cited

U.S. PATENT DOCUMENTS

2013/0301446 A1   11/2013   Chen et al.
2014/0023008 A1   1/2014    Ahn et al.
(Continued)

FOREIGN PATENT DOCUMENTS

KR   10-2012-0074254 A   7/2012
KR   10-2015-0106921 A   9/2015
WO   2015/147376 A1      10/2015

OTHER PUBLICATIONS

Sony, "PC5 enhancements on resource allocation for V2V Services", R1-156709, 3GPP TSG RAN WG1 Meeting #83, Anaheim, USA, Nov. 15-22, 2015, pp. 1-5.
(Continued)

*Primary Examiner* — Phirin Sam
(74) *Attorney, Agent, or Firm* — IP Legal Services, LLC

(57) ABSTRACT

Provided are a method and apparatus for supporting mobile communication network-based vehicle to everything (V2X) communication. The method may include: transmitting, to a base station, terminal assistance information for semi-persistent scheduling (SPS) of radio resources for V2X communication; receiving, from the base station, SPS configuration information generated using the terminal assistance information; and performing V2X communication by using the SPS configuration information.

9 Claims, 9 Drawing Sheets

(51) Int. Cl.
*H04W 72/04* (2009.01)
*H04W 56/00* (2009.01)
*H04W 4/40* (2018.01)
*H04W 8/24* (2009.01)

(52) U.S. Cl.
CPC ....... *H04W 56/001* (2013.01); *H04W 72/042* (2013.01); *H04W 72/0406* (2013.01); *H04W 72/0413* (2013.01); *H04W 72/0446* (2013.01)

(56) References Cited

U.S. PATENT DOCUMENTS

| | | | |
|---|---|---|---|
| 2014/0023011 A1* | 1/2014 | Gao | H04B 7/0636 370/329 |
| 2014/0198699 A1 | 7/2014 | Makharia et al. | |
| 2015/0282210 A1 | 10/2015 | Li et al. | |
| 2016/0366641 A1 | 12/2016 | Makharia et al. | |
| 2016/0381539 A1 | 12/2016 | Park et al. | |
| 2017/0019887 A1* | 1/2017 | Jiang | H04W 72/042 |
| 2018/0049224 A1* | 2/2018 | Dinan | H04W 72/1263 |
| 2018/0049225 A1* | 2/2018 | Lee | H04W 36/00 |
| 2018/0124648 A1* | 5/2018 | Park | H04W 36/0005 |
| 2018/0132208 A1* | 5/2018 | Pan | H04W 4/06 |
| 2018/0139586 A1* | 5/2018 | Park | H04W 4/06 |
| 2018/0160445 A1* | 6/2018 | Babaei | H04W 72/14 |
| 2018/0234807 A1* | 8/2018 | Park | H04W 72/005 |
| 2019/0356427 A1* | 11/2019 | Babaei | H04W 72/042 |

OTHER PUBLICATIONS

Catt, "Further discussion on resource allocation mechanism in PC5-based V2V", R1-157449, 3GPP TSG RAN WG1 Meeting #83, Anaheim, USA, Nov. 15-22, 2015, pp. 1-10.

ZTE, "Enhancement of resource allocation and procedure for V2V", R1-157777, 3GPP TSG-RAN WG1 Meeting #83, Anaheim, USA, Nov. 15-22, 2015, pp. 1-8.

Huawei et al., "Potential RAN2 Issues for PC5-based V2V", R2-156580, 3GPP TSG-RAN WG2 Meeting #92, Anaheim, US, Nov. 16-20, 2015, pp. 1-5.

* cited by examiner

VEHICLE TO EVERYTHING COMMUNICATION CONTROL METHOD AND APPARATUS THEREFOR

CROSS REFERENCE TO RELATED APPLICATIONS

This application is a National Stage Patent Application of PCT International Patent Application No. PCT/KR2017/000025 (filed on Jan. 2, 2017) under 35 U.S.C. § 371, which claims priority to Korean Patent Application Nos. 10-2016-0014510 (filed on Feb. 4, 2016), and 10-2016-0175028 (filed on Dec. 20, 2016), the teachings of which are incorporated herein in their entireties by reference.

TECHNICAL FIELD

The present disclosure relates to a method and an apparatus for supporting Vehicle to Everything (V2X) based on a mobile communication network.

BACKGROUND ART

Communication technology has advanced to allow rapid exchanging of information among electronic devices. Such communication technology has changed services, technology, and life in various aspects. In connection therewith, technology related to vehicle communication has advanced. For example, an intelligent traffic system and intelligent vehicle technology have been introduced and advanced abruptly.

Particularly, due to the advance of vehicle communication technologies, various services have been introduced for providing real time-traffic information, vehicle safety warning messages, and messages for smoothing traffic flow and cooperative driving using vehicle communication in vehicles.

Vehicle to Everything (V2X) generally refers to technology for communication of vehicles with all related interfaces. V2X may include Vehicle to Vehicle (V2V), Vehicle to Infrastructure (V2I), Vehicle to Pedestrian (V2P), and the like. V2X has been developed for improving safety, convenience, and traffic flow efficiency.

For V2X communication, radio communication resources and a corresponding wireless communication protocol are required. Particularly, V2X communication has adopted mobile communication technology and has been commercialized in many countries.

In V2X communication, vehicles frequently and periodically transmit and receive information. Such information may have a size smaller than that of typical mobile communication data. However, the information may be continuously generated at a comparatively short period. Accordingly, for V2X communication, it is not inadequate to use a typical transmission/reception radio resource allocation method through dynamic scheduling, which is used in the typical mobile communication. Such a typical dynamic scheduling may abruptly increase data load, and deteriorate the entire system performance.

Therefore, there is a demand for a radio-resource-scheduling method for V2X communication and a scheduling method for a UE having high mobility.

DETAILED DESCRIPTION OF THE INVENTION

Technical Problem

In accordance with an embodiment, a radio-resource-scheduling method and apparatus may be provided for stably supporting V2X communication even while moving at a high speed based on mobile communication technology (for example, LTE or LTE-Advanced).

In accordance with an embodiment, a scheduling method and apparatus may be provided for dynamically reflecting the state of a UE in a radio-resource-scheduling process for V2X communication.

Technical Solution

In accordance with an embodiment, a method may be provided for performing Vehicle-to-Everything (V2X) communication by a User Equipment (UE). The method includes: transmitting UE assistance information for Semi-Persistent Scheduling (SPS) of V2X communication radio resources to a Base Station (BS); receiving SPS configuration information generated using the UE assistance information from the BS; and performing the V2X communication based on the SPS configuration information.

In accordance with another embodiment, a method may be provided for controlling Vehicle-to-Everything (V2X) communication of a User Equipment (UE) by a Base Station (BS). The method includes: receiving UE assistance information for Semi-Persistent Scheduling (SPS) of V2X communication radio resources; generating SPS configuration information for the V2X communication of the UE based on the UE assistance information; and transmitting the SPS configuration information to the UE.

In accordance with further another embodiment, a User Equipment (UE) may be provided for performing Vehicle-to-Everything (V2X) communication. The UE includes: a transmitter configured to transmit UE assistance information for Semi-Persistent Scheduling (SPS) of V2X communication radio resources to a Base Station (BS); a receiver configured to receive SPS configuration information generated using the UE assistance information from the BS; and a controller configured to perform the V2X communication based on the SPS configuration information.

In accordance with still another embodiment, a Base Station (BS) may be provided for controlling Vehicle-to-Everything (V2X) communication of a User Equipment (UE). The BS includes: a receiver configured to receive UE assistance information for Semi-Persistent Scheduling (SPS) of V2X communication radio resources from the UE; a controller configured to generate SPS configuration information for the V2X communication of the UE based on the UE assistance information; and a transmitter configured to transmit the SPS configuration information to the UE.

Advantageous Effects

In accordance with embodiments, it is able to effectively provide sidelink-based V2X communication using V2X communication-dedicated carriers, prevent radio resources from being unnecessarily wasted by radio resource scheduling for V2Xcommunication, and efficiently perform radio resource scheduling by reflecting the state of the UE.

MODE FOR CARRYING OUT THE INVENTION

Figure 1:
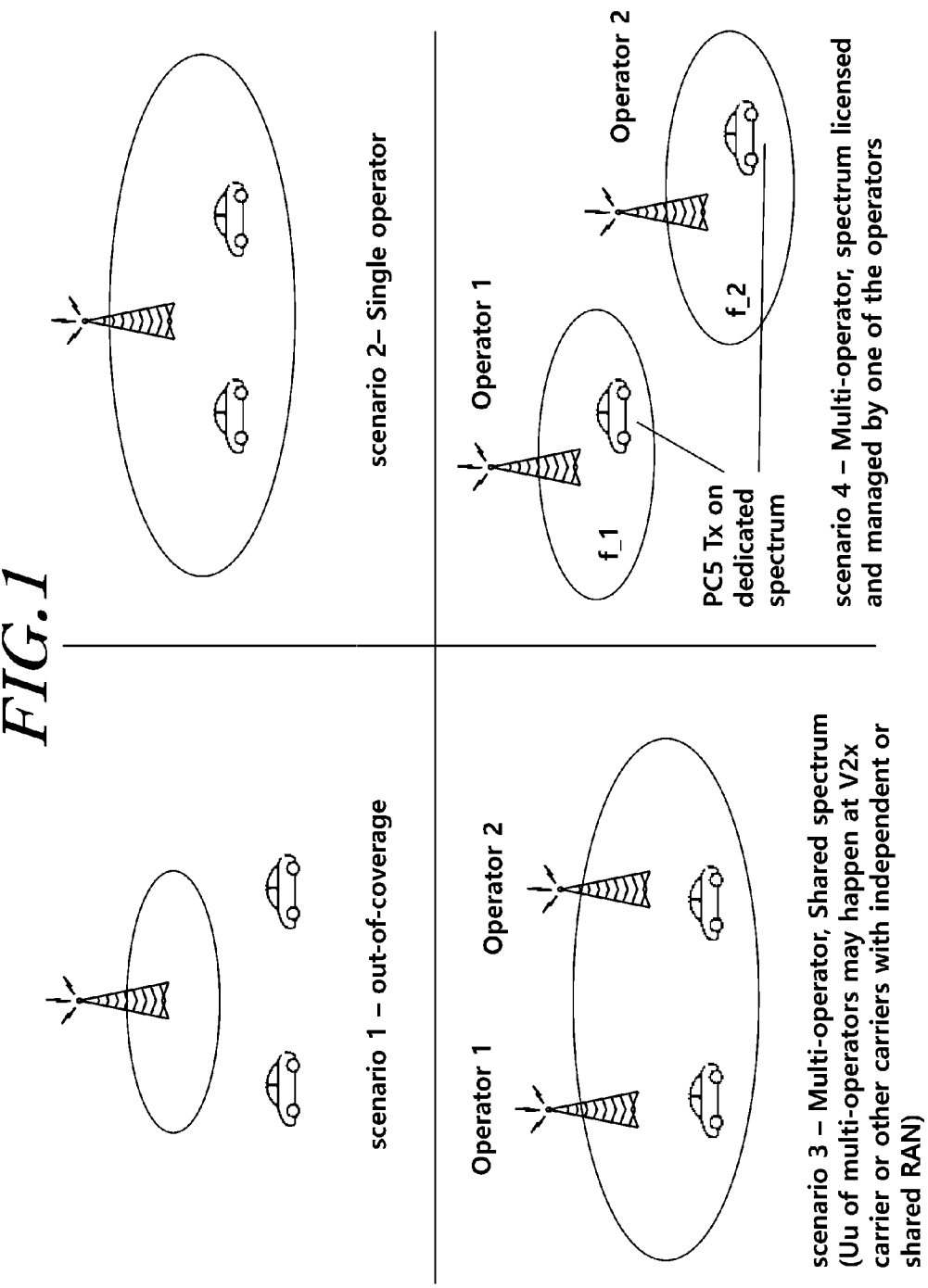
FIG. 1 is an exemplary diagram for describing a V2X communication scenario according to an embodiment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a machine type communication (MTC) terminal refers to a terminal that is low cost (or is not very complexity), a terminal that supports coverage enhancement, or the like. In the present specifications, the MTC terminal refers to a terminal that supports low cost (or low complexity) and coverage enhancement. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined $3^{rd}$ generation partnership project (3GPP) Release 13 low cost (or low complexity) UE category/type, which executes long term evolution (LTE)-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), LTE, high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed, and the base station or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways. i) the base station may be a device itself that provides a megacell, a macrocell, a microcell, a picocell, a femtocell, and a small cell in association with a wireless area, or ii) the base station may indicate a wireless area itself. In i), a base station may be devices that interact with one another to provide a predetermined wireless area by being controlled by an identical entity or by cooperating with each other. Based on a configuration type of a wireless area, the base station may be referred to as an eNB, an RRH, an antenna, an RU, a Low Power Node (LPN), a point, a transmission/reception point, a transmission point, a reception point, and the like. In ii), the base station may be a wireless area itself that receives or transmits a signal from a perspective of a terminal or a neighboring base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications. However, the user equipment and the base station may not be limited to a predetermined term or word. Here, Uplink (UL) refers to a scheme for data transmission/reception from a UE to a base station, and Downlink (DL) refers to a scheme for data transmission/reception from a base station to a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field and may include all technical fields in which the technical idea of the present disclosure is applicable.

Uplink transmission and downlink transmission may be performed based on i) a TDD (Time Division Duplex) scheme that performs transmission based on different times or ii) an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like. The uplink and the downlink may transmit data through a data channel, such as a PDSCH (Physical Downlink Shared CHannel), a PUSCH (Physical Uplink Shared CHannel), and the like.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In an uplink, a transmitter may be a part of a terminal and a receiver may be a part of a multiple transmission/reception point. In an uplink, a transmitter may be a part of a terminal and a receiver may be a part of a multiple transmission/reception point.

Hereinafter, signal transmission or signal reception through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel may indicate a PDCCH or an EPDCCH and may indicate a meaning including both a PDCCH and an EPDCCH.

For ease of description, embodiments may be described used an PDCCH. However, an EPDCCH may be applied to the embodiments.

Meanwhile, higher layer signaling includes an radio resource control (RRC) signaling that transmits RRC information including an RRC parameter.

An eNB executes downlink transmission to terminals. The eNB may transmit a Physical Downlink Shared Channel (PDSCH) which is a primary physical channel for unicast transmission, and the eNB may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

An apparatus and a method according to an embodiment of the present disclosure can be applied to various communication systems, such as a Long Term Evolution (LTE) mobile communication system, a LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system of 3rd Generation Project Partnership 2 (3GPP2), a Wideband Code Division Multiple Access (WCDMA) mobile communication system 3GPP2, a Code Division Multiple Access (CDMA) mobile communication system of 3GPP2, Institute of an Electrical and Electronics Engineer (EEEE) 802.16m communication system, an Evolved Packet System (EPS), a Mobile Internet Protocol (Mobile IP) system and the like.

Hereinafter, embodiments are described based on a V2X communication system for convenience and ease of understanding. However, such descriptions of embodiments do not limit the content or the scope of the specification to the V2Xcommunication system. In general, embodiments of the present disclosure may be applied to communication between user equipments while the user equipments travel at high speed (for example, sidelink communication). Further, although various embodiments are separately described in the specification, the embodiments can be integratedly implemented unless the embodiments are mutually contradictory or explicitly conflict with each other. In addition, the term "UE" is an entity which may support IoT or V2X communication. For example, the UE may refer to a communication device within a vehicle, a smart phone, or the like. In the specification, an entity that supports V2X communication will be referred to as a "UE", a "V2X device", or a "vehicle".

V2X communication is a technology for device to device (D2D) communication and may be included in sidelink direct communication within a wide range. Accordingly, hereinafter, the sidelink direct communication will be briefly described.

Sidelink Direct Communication

When an RRC-connected UE is interested in sidelink communication, the RRC-connected UE transmits a sidelink UE information message to a Base Station (BS). In response to the message, the BS may configure a sidelink RNTI for the UE.

Whenever the UE detects a cell on a public disaster Prose carrier, the UE is considered as being within the coverage (in-coverage) for Prose direct communication. The following rules are applied to the UE.

Whenever the UE detects a cell on a public disaster Prose carrier, the UE is considered to be within the coverage (in-coverage) for Prose direct communication. The following rules are applied to the UE.

If the UE is out of coverage, the UE may use only autonomous resource selection.

If the UE is in-coverage for sidelink communication, the UE may use scheduled resource allocation or autonomous resource selection depending on the BS configuration. For example, a lower layer is configured to transmit sidelink control information and corresponding data through indicated resources within a resource pool.

If the UE is in-coverage, the UE should use only a resource allocation mode indicated by the BS configuration except for the cases defined in RRC (for example, exceptional cases described in a 3GPP TS 36.331 document).

When an exceptional case such as radio link failure occurs even though the UE is configured to use scheduled resource allocation, the UE may be allowed to temporarily use UE autonomous resource selection. As described above, a resource pool to be used in such an exceptional case may be provided by the BS.

The UE, which camps on or accesses one carrier frequency but is interested in Prose direct communication on another carrier frequency, should attempt to find a cell on a public disaster Prose carrier (hereinafter, referred to as a Prose carrier for convenience of description).

The RRC_IDLE UE, which camps on the cell on another carrier frequency but is within a coverage area of the E-UTRA cell on the Prose carrier, may consider the Prose carrier with the top priority. The UE re-selects the Prose carrier.

The RRC_CONNECTED UE receiving service by a cell within another carrier frequency may transmit Prose direct communication indication information to the serving cell when the UE desires to perform Prose direction communication. The indication information includes information on an intended Prose carrier.

The serving cell indicates whether transmission of a Prose UE information message of the UE is allowed through the existence of System Information Block (SIB) 18.

The serving cell may configure inter-frequency RRM measurement on a Prose carrier.

When the UE enters the cell coverage on the Prose carrier, the BS performs inter-frequency mobility through the Prose carrier based on a measurement report.

If inter-frequency mobility is not performed by the serving cell, the UE may perform sidelink communication using UE autonomous resource selection from a resource pool broadcasted by an E-UTRN cell on the ProSe carrier.

If the UE cannot detect the E-UTRA cell on the Prose carrier, the UE may use public disaster Prose resources pre-configured in UICC or ME for Prose direct communication going beyond the coverage.

If the UE detects the E-UTRA cell on the Prose carrier, the UE stops using the resources pre-configured in UICC or ME. The UE may perform sidelink communication using UE autonomous resource selection from the resource pool broadcasted by the E-UTRA cell detected on the ProSe carrier.

Hereinafter, V2X communication will be described as an example of sidelink communication.

V2X Communication

The vehicle may be connected to the Internet and another vehicle by providing access to a mobile communication network (for example, LTE or LTE-Advanced) to the vehicle. Vehicle to Everything (V2X) includes the following three types.

Vehicle-to-Vehicle (V2V) communication
Vehicle-to-Infrastructure (V2I) communication
Vehicle-to-Pedestrian (V2P) communication In 3GPP Release-12, as Device-to-Device (D2D) technology is standardized, a basic environment for operating V2X communication based on LTE communication technology is constructed. However, V2X may have various use cases and requirements according to the use cases, and methods of applying LTE-based V2X may be performed in various scenarios. Accordingly, when V2X is applied using the typical LTE technology, there may be a problem in the details thereof.

For example, in the typical LTE technology, sidelink communication/discovery/synchronization resource configuration is applied to a frequency on which it is received or acquired. Further, with respect to a UE configured with one or more Secondary Cells (SCells), the sidelink communication/discovery/synchronization resource configuration provided by dedicated signaling is applied to a Primary Cell (PCell) or a primary frequency.

For another example, V2X service may be applied to a larger number of UEs having higher mobility compared to a Prose service. When large-scale UEs which desire to use the V2X carrier are positioned in a particular area, a hidden node problem may become more serious due to mobility. Accordingly, it may cause higher system load and serious interference. Therefore, in the case of the UE providing the V2X service, it is preferable to perform communication through scheduled resource allocation compared to autonomous resource allocation.

However, in the related art, when the UE cannot detect the cell with respect to another V2X carrier which is not the PCell that the UE accesses, the UE uses only autonomous resource allocation or receives the V2X configuration through the corresponding V2X carrier with respect to the other V2X carrier which is not the PCell that the UE accesses.

Meanwhile, V2X communication may provide a service in scenarios 1 to 3.

FIG. 1 illustrates exemplary scenarios of V2X communication according to an embodiment. Each scenario of FIG. 1 is described below.

Scenario 1: The UE goes beyond the V2X carrier.
Scenario 2: The V2X carrier is permitted by a single operator, and the UE is within the coverage of the single operator for V2X communication.
Scenario 3: The V2X carrier is shared by a plurality of operators, and the UE is within the coverage of the operator for V2X communication.
Scenario 4: A V2X message is transmitted on a dedicated and allowed frequency managed by each operator and is received on all frequencies.

Since scenario 1 corresponds to out-of-coverage, the UE may use autonomous resource selection for pre-configured resources. Since scenario 2 corresponds to in-coverage, the UE may use resource allocation scheduled according to BS configuration or autonomous resource selection.

Figure 2:
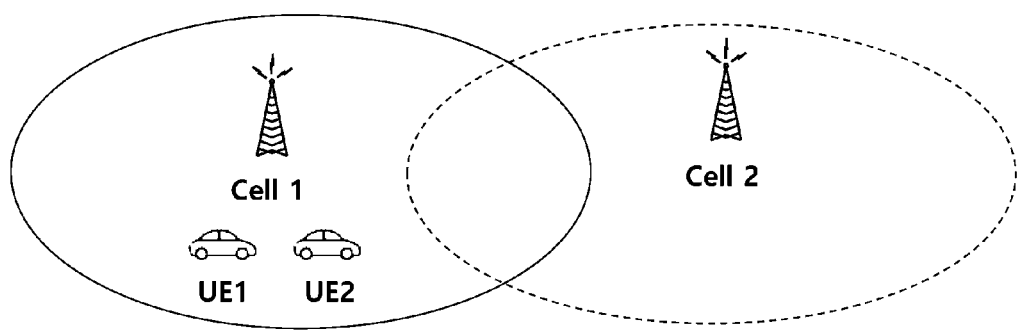
FIG. 2 is another exemplary diagram for describing a V2X communication scenario according to an embodiment.

FIG. 2 illustrates another exemplary scenario of V2X communication according to an embodiment. Cell 1 denotes a cell using a carrier that is not a V2X carrier. Cell 2 denotes a cell using the V2X carrier.

Figure 3:
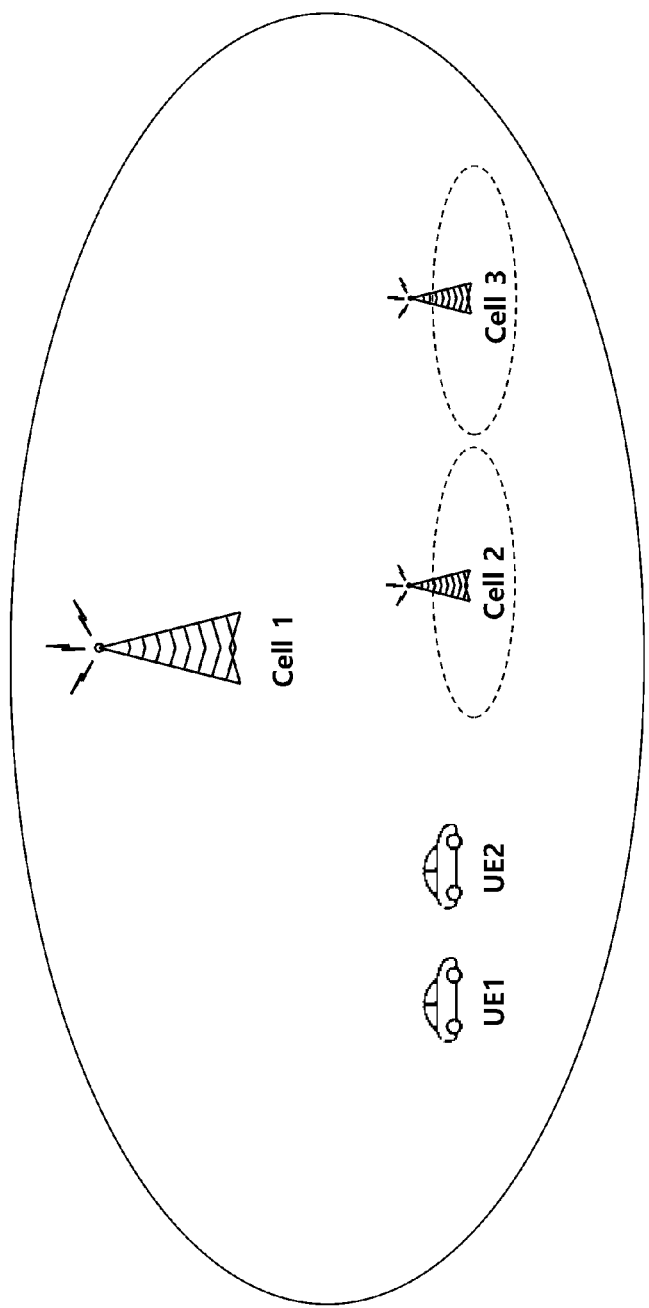
FIG. 3 is still another exemplary diagram for describing a V2X communication scenario according to an embodiment.

FIG. 3 illustrates still another exemplary scenario of V2X communication scenario according to an embodiment. There are assumptions for the scenario of FIG. 3. First, a macro cell/macro cell BS/macro cell BS cell (cell 1) uses a carrier, which is not the V2X carrier. Secondly, small cells (cell 2 and cell 3) use the V2X carrier.

In the scenarios illustrated in FIG. 1 to FIG. 3, the UE performs V2X communication using the V2X carrier. To this end, the UE must receive allocation of radio resources including the V2X carrier. That is, since the V2X communication using the mobile communication technology uses limited radio resources, it is required to receive allocation of sidelink resources for the V2X communication.

As described above, when the RRC-connected UE according to the related art desires to perform direct communication for a V2X service, the UE may use only autonomous resource allocation if the UE cannot detect the cell with respect to another V2X carrier, which is not the PCell that the UE accesses, or should receive the V2X/sidelink configuration through the corresponding carrier with respect to another V2X carrier, which is not the PCell that the UE accesses.

The present embodiments made to solve the problem aim to provide a method of allocating resources for LTE-based efficient V2X communication and controlling V2X communication.

When the UE is in the BS coverage on the carrier for performing the V2X operation (referring to one or more operations of V2V/sidelink, sidelink direct communication, discovery, and synchronization signal transmission, and hereinafter referred to as the V2X operation for convenience of description), that is, when a Uu interface between the UE and the BS and PC5 between UEs share a carrier, the BS may control parameters that influence UE resource selection. Since the above-conditions indicate that the PCell carrier and the V2X carrier are the same, the UE is within the coverage. Accordingly, as like the related art, the BS may use scheduled resource allocation or autonomous resource selection.

When no cell is detected within the V2X operation carrier but the UE is within the BS coverage within another carrier, that is, when a carrier of Uu between the UE and the BS and a carrier of PC5 between UEs are different carriers, the BS may control parameters that influence UE resource selection. This corresponds to the case in which no cell is detected within the V2X carrier, for example, the case corresponding to the UE which goes beyond the coverage according to the related art. In the related art, for the UE which goes beyond the coverage, only UE autonomous resource allocation through pre-configuration was possible.

However, a V2X service may be applied to more UEs having higher mobility compared to a Prose service. Large-scale UEs which desire to use the V2X carrier are positioned in a particular area, and a hidden node problem may become serious due to mobility. Accordingly, it causes significantly increasing a system load and serious interference. Therefore, even when the UE detects no cell within the V2X carrier, the BS may control resource allocation of the UE if the Uu carrier and the PC5 carrier are allocated to the same service provider. For example, when a particular service provider receives and uses a different Uu carrier and PC5 carrier, uplink traffic may be transmitted to the BS through the Uu carrier, so that transmission of uplink traffic through the PC5 carrier may not be needed. Alternatively, since the operation through the V2X carrier may allow transmission/reception based on Uu carrier timing, a value using an offset for Uu carrier timing, UTC, or, GNSS or GNSS-equivalent timing, the operation of downlink transmission of the corresponding V2X-dedicated carrier may not be needed all the time when the V2X-dedicated carrier is used. Hereinafter, a method of providing this will be described. The case in which the UE detects no cell within the V2X carrier means i) the case in which the UE goes beyond the V2X carrier coverage, the case in which a downlink carrier for (user) data transmission from the BS to the UE is not operated, ii) the case in which the BS transmits configuration information for the V2X carrier through a Uu downlink carrier, iii) the case in which the V2X-dedicated carrier is simply used, or iv) the case in which the V2X-dedicated carrier distinguished from the Uu carrier is used, but is used as the case in which the UE detects no cell within the V2X carrier for convenience of description. Embodiments of the present disclosure may be implemented based on one or more of the above-described cases. Each of the above-described cases will be described, and such descriptions are included in the scope of the present disclosure.

In the specification, the term "V2V carrier", "sidelink carrier", or "V2X carrier" refers to radio resources or frequency resources such as a carrier allocated for V2X communication. Hereinafter, the V2V carrier, the sidelink carrier, and the V2X carrier will be described as the V2X carrier, but the terms "V2V carrier" and "sidelink carrier" may be interchangeably used as necessary.

As described above, for V2X communication, the UE must receive allocation of radio resources for V2X communication. The radio resources for the V2X communication may be dynamically allocated, autonomously selected, or allocated according to semi-persistent scheduling.

Hereinafter, a dynamic resource allocation method will be described as an example of resource allocation methods for V2X communication, and cross-carrier scheduling for the dynamic resource allocation will be also described.

Dynamic Resource Allocation Method

When the UE cannot detect any cell within the V2X carrier but is in another cell coverage, which is not that of the V2X carrier, the BS may use resource allocation scheduled for the V2X carrier. For example, the BS may transfer information (or information for instructing an RRC_IDLE UE to initiate RRC connection) for indicating dynamic resource allocation of the V2X carrier (on the V2X carrier or of V2X carrier frequency resources) through the cell/PCell/macrocell using another frequency, which is not that of the V2X carrier, to the UE (through RRC signaling). For example, when the UE goes beyond the V2X carrier coverage and is within the coverage of a cell (for example, a PCell/serving cell) using another carrier, which is not the V2X carrier, the BS may transfer information for configuring the V2X transport resources/V2X carrier to be scheduled by the cell to the UE. For example, the V2X communication resource allocation information may include information configuring the UE to receive scheduling of the V2X carrier through the cell to which the UE currently belongs. When the UE is set such that V2X transmission resources are scheduled by the information (dynamic resource allocation indication is configured by the V2X carrier), a MAC entity must have a sidelink grant for transmission on a sidelink shared channel (SL-SCH). Alternatively, resources scheduled according to the sidelink grant, dynamically scheduled resources, or semi-persistent scheduling resources may be used.

When V2X communication is performed through a PC5 interface, a sidelink Buffer State Report (BSR) of the UE is triggered. The sidelink BSR is used to provide information on an amount of sidelink data available for transmission within the sidelink buffer of the MAC entity to the serving BS. The UE transmits a scheduling request (D-SR or random access), followed by the sidelink BSR, to the BS. Based on the sidelink BSR, the BS may determine that the UE has data for sidelink communication and estimate resources required for transmission. The BS may schedule transmission resources for sidelink communication using a configured sidelink RNTI.

When the BSR (for example, the sidelink BRS) for a V2X operation is triggered, the BSR for the V2X communication may be transferred to the BS through a serving cell. The BSR for the V2X communication may include a field for identifying buffer size information in data transmission through the V2X carrier. Alternatively, the BS may identify and recognize the buffer size information in data transmission through the V2X carrier based on field information included in the BSR. For example, a BSR format for the V2X operation may include a field for identifying the buffer size through the V2X service on the V2X carrier. Accordingly, the BS may be aware of information on an amount of particular V2X data to be transmitted by the UE through the V2X carrier.

Meanwhile, when the MAC entity is configured to dynamically receive the sidelink grant on a PDCCH or an EPDCCH and when much more data than the amount of data that can be transmitted on a current sidelink control period are used in a Sidelink Traffic Channel (STCH), the MAC entity determines a subframe set, in which Sidelink Control Information (SCI) transmission and transmission of a first transport block are generated, using the received sidelink grant. The MAC entity may consider the received sidelink grant as a configured sidelink grant generated in a subframe starting at a beginning of a first available SC period starting at a subframe after at least four subframes from a subframe in which the sidelink grant is received. The MAC entity removes the sidelink grant configured at the end of the corresponding SC period.

The sidelink grant may include one or more pieces of information for identifying the V2X carrier, which is distinguished from the serving cell or the cell (for example, the PCell or macrocell) using a frequency which is not the V2X carrier, information for determining or limiting sidelink transmission synchronization or timing, and information for indicating activation, re-activation, or release of semi-persistent resource allocation through the V2X carrier.

Meanwhile, the UE should perform a synchronization process for V2X communication. The synchronization for V2X communication may be configured using various synchronization sources.

For example of synchronization/timing, based on transmission resources received from a cell (for example, the PCell/serving cell) using another carrier, which is not the V2X carrier, the UE may perform communication through the V2X carrier with timing of the corresponding cell (the cell using the other carrier, which is not the V2X carrier). For another example, based on the transmission resources received from the cell (for example, the PCell/serving cell) using the other carrier, which is not the V2X carrier, the UE may perform communication through the V2X carrier with timing of a synchronization source to be transmitted through the V2X carrier. For further another example, based on transmission resources received from the cell (for example, the PCell/serving cell) using the other carrier, which is not the V2X carrier, the UE may perform communication through the V2X carrier by autonomously selecting timing. For still another example, based on transmission resources received from the cell (for example, the PCell/serving cell) using the other carrier, which is not the V2X carrier, the UE may perform communication through the V2X carrier by selecting timing within timing information (offset) included in transmission resource information received from the BS. For yet another example, the UE may perform a V2X operation through the V2X carrier by using GNSS (or a GNSS-equivalent synchronization source, a GPS, a GLONASS, a BDS, a GALILEO, or the like, GNSS being used hereinafter for convenience of description) synchronization.

The BS may instruct the UE to configure synchronization for PC5-based V2X during BS-based synchronization and GNSS synchronization. For example, when the UE is located within the carrier operating on sidelink-based V2X, the BS may indicate priorities of the BS-based synchronization and the GNSS synchronization to the UE. For another example, the BS may allow the UE to perform the V2X operation according to the GNSS synchronization. For further another example, when no cell is detected within the V2X carrier or the UE is located within another cell coverage area instead of that of the V2X carrier, the BS may allow the UE to perform the V2X operation according to the GNSS synchronization.

As described above, the UE may configure synchronization timing based on the BS-based timing synchronization or the GNSS-based timing synchronization.

Meanwhile, in another method of dynamically allocating radio resources for V2X communication, information (or information for instructing an RRC_IDLE UE to initiate RRC connection) for indicating dynamic resource allocation for V2X carrier resources may be broadcasted through system information (for example, SystemInformationBlockType18) of the cell (for example, the PCell) using another cell which is not the V2X carrier. At this time, in order to decrease V2X service latency of the corresponding cell, the UE may identify a resource pool (for example, a common transmission resource pool for transmission before dynamic resource allocation or a resource pool for a delay reduction commTxPoolNormalCommon or commTxPoolExceptional) to be used by the UE to perform V2X communication through system information of the cell using another carrier, which is not the V2X carrier.

The UE may initiate RRC connection if V2X/sidelink communication is configured to be transmitted by the higher layer and relevant data is available for transmission, if the system information is broadcasted by the cell on which the UE camps, and if the system information includes information indicating the initiation of the RRC connection. Alternatively, the UE may initiate RRC connection if V2X/sidelink communication is configured to be transmitted by the higher layer and relevant data is available for transmission, if the system information is broadcasted by the cell on which the UE camps, and if the system information does not include a normal common transmission pool (for example, commTxPoolNormalCommon).

Meanwhile, in another example of allocating dynamic V2X radio resources, for the UE configures RRC connection based on a cell, which is not the V2X carrier, as the PCell, the BS may configure cross-carrier scheduling and perform dynamic resource allocation. Hereinafter, dynamic resource allocation through cross-carrier scheduling will be briefly described.

Cross Carrier Scheduling

When the UE cannot detect any cell within the V2X carrier but is in another cell coverage area, which is not that of the V2X carrier, the BS may use resource allocation scheduled for the V2X carrier. For example, through cross-carrier scheduling, the BS may transfer relevant indication information to indicate/configure dynamic resource allocation (or semi-persistent resource allocation) of the V2X carrier (on the V2X carrier or of V2X carrier frequency resources) through a cell/PCell/macro cell using another frequency, which is not that of the V2X carrier (through RRC).

In the typical LTE technology, the cross-carrier scheduling configuration was applied only to a secondary cell provided through carrier aggregation. That is, by allocating scheduling cell identification information to a particular secondary cell, scheduling (resource allocation information) for the corresponding secondary cell is performed through the allocated scheduling cell (for example, the PCell or another serving cell). For example, the BS may add the corresponding cell based on measurement reporting obtained by finding or measuring and then reporting the V2X carrier by the UE and designate the cell to schedule the corresponding cell as the cell (PCell), which is not the V2X carrier.

However, as described above, when no cell is detected within the V2X carrier or the UE is within another cell coverage area which is not that of the V2X carrier, the UE does not need to add the V2X carrier to use it like the normal secondary cell. In order to use the cell through the V2X carrier, the UE does not need to activate or deactivate the cell through the V2X carrier. The UE does not need to receive downlink control information/user data through the cell through the V2X carrier, and the UE also does not need to perform channel state reporting on the downlink control information/user data.

The BS may designate a cell to indicate resource allocation information through a PDCCH/EPDCCH through the cross-carrier scheduling configuration and to indicate the resource allocation information (e.g. DCI) through the corresponding cell, thereby allowing the UE to perform the V2X operation.

As described above, since the V2X carrier is different from the normal secondary cell, the BS may allow the UE to recognize the V2X carrier to be distinguished from the normal secondary cell (or the carrier for the normal secondary cell).

For example, when no cell is detected within the V2X carrier or when the UE is located within another cell coverage area which is not that of the V2X carrier, the BS may insert frequency information of the V2X carrier into system information transmitted through a cell (e.g. Pcell) of another carrier, which is not the V2X carrier. Alternatively, the BS may add (uplink) frequency information of the V2X carrier (for FDD, and only the V2X carrier is added for TDD) by adding uplink frequency information of the cell, which is not that of the V2X carrier, to an uplink carrier frequency on system information 2 transmitted through the cell of the other carrier (e.g. PCell), which is not the V2X carrier. In the related art, for FDD, if the uplink carrier frequency broadcasted through system information 2 is absent, the value determined from the default TX-RX frequency separation defined in TS 36.101 is applied. For TDD, this parameter is absent, and it is equal to the downlink frequency. However, since data transmission through the V2X carrier uses only the uplink band, the V2X operation may be performed through cross-carrier scheduling while using the cell which is not that of the V2X carrier for downlink transmission.

For another example, the UE may transmit information for indicating transmission of generated uplink control information (for example, a PUCCH) or uplink data information (a PUSCH) through the serving cell (Pcell or another serving cell) which is not that of the V2X carrier to the UE due to V2X resource allocation through cross-carrier scheduling. This may be broadcasted through system information or indicated through UE-dedicated signaling. For example, the BS may use an uplink PUCCH cell associated/linked to the scheduling cell as a feedback cell for a scheduling grant of the corresponding V2X carrier through cross-carrier scheduling. For further another example, when semi-persistent scheduling is configured for the V2X operation, control information related to activation or deactivation of semi-persistent scheduling may be transmitted through the serving cell which is not the V2X carrier. Further, feedback (ACK/NACK) for the scheduling information may be transmitted through the uplink cell associated/linked to the scheduling cell.

For still another example, although the UE detects the cell within the V2X carrier in the embodiments related to the cross-carrier scheduling, the embodiments may be used when the UE is located in another cell coverage area which is not that of the V2X carrier and when the UE adds the V2X carrier as the secondary cell. For example, the embodiments may be used when the UE is located at a place in which another cell coverage area, which is not that of the V2X carrier, overlaps the V2X carrier cell coverage and when the UE and the RRC-connected UE adds the V2X carrier as the secondary cell (or another added cell which is not the normal secondary cell) based on the other cell, which is not the V2X carrier, as the PCell.

Meanwhile, semi-persistent scheduling of the V2X communication resource allocation method will be described below.

Semi-Persistent Scheduling (SPS)

A V2X service flow requires frequent and successive transmissions in many cases. In such repetitive transmissions, the payload is very small. Accordingly, the conventional scheduling method may have very large overhead due to dynamic allocation. Therefore, by allocating resources to the UE through a semi-persistent scheduling scheme, a problem occurring due to a dynamic scheduling resource allocation request of the UE can be significantly reduced.

In the related art, SPS may be configured only for the PCell (or PSCell). In the case of the secondary cell, because the corresponding cell is not always activated, the application of semi-persistent scheduling is complex and thus SPS is not applied.

However, when no cell is detected within the V2X carrier but the UE is located in another cell coverage area which is not that of the V2X carrier (or when the UE desires to perform the V2X operation through the V2X-dedicated carrier while the UE is RRC-connected to another cell which is not the V2X carrier or when the UE desires to perform the V2X operation by adding the V2X-dedicated carrier while the UE is RRC-connected to the other cell, which is not that of the V2X carrier), the BS may configure SPS through the V2X-dedicated carrier. As described above, the V2X-dedicated carrier may be used for the V2X operation unlike the normal secondary cell. Meanwhile, in the following description, the BS may configure SPS through the V2X carrier even when the UE shares a V2X interface (PC5) carrier and a Uu interface carrier with the BS.

To this end, the BS may insert information for configuring SPS into the V2X carrier and transmit the information to the UE through an RRC message. For example, the BS may transmit SPS configuration information to the UE in order to configure SPS in the UE.

For example, the RRC message may include interval information indicating periodic allocation of radio resources. The BS may insert information included in V2X control information into SPS configuration information through PHY signaling (PDCCH/EPDCCH) and transmit the information through an RRC message. The RRC message may include one or more pieces of group destination identifier information, modulation and coding scheme information, resource block allocation information, hopping resource allocation information, frequency hopping flag, timing advance, offset information between BS timing and V2X transmission timing, offset information for synchronization using an absolute value when PDCCH reception timing of the UE corresponds to a reference time, information indicating synchronizing GNSS-based timing, information indicating whether to override SPS priority, and V2X buffer state information.

For example, when resource allocation information masked by a sidelink RNTI is received in a subframe in which radio resources for SPS are configured, the UE may use radio resources indicated by dynamic scheduling in the corresponding subframe without using radio resources configured by SPS. For example, when a priority of V2X data configuring SPS (for example, PPPP, logical channel priority, or a higher-layer priority) is not high, the UE may use radio resources indicated by dynamic scheduling.

For another example, when resource allocation information masked by a sidelink RNTI is received in a subframe in which radio resources for SPS are configured, the UE may use radio resources configured by SPS without using radio resources indicated by dynamic scheduling in the corresponding subframe. For example, when a priority of V2X data configuring SPS (for example, PPPP, logical channel priority, or a higher-layer priority) is high, the UE may not use radio resources indicated by dynamic scheduling. When the BS configures SPS in the UE, the BS may transmit information for indicating such an operation to the UE.

Meanwhile, when the SPS is configured, the UE may transmit UE assistance information for the SPS to the BS. For example, when the SPS is configured, the UE may transfer assistance information for an SPS interval to the BS.

Through V2X, different traffic characteristics and data having different QoS requirements may be transmitted. For example, a pre-crash sensing warning having a strict delay requirement of 20 ms, a forward collision warning/queue warning having a delay requirement of 100 ms, and cooperative adaptive cruise control information having a delay requirement of 1 second may be transmitted. Further, the UE may periodically transmit information such as a current position, speed, and acceleration of the UE. A period of the information may be changed i) according to a UE density, traffic, or an application that is used, or ii) according to the configuration provided by an operator. The UE may have a transmission period changed according to a period configured by a higher layer (for example, a service or an application entity) or an indication of a V2X service server/platform/application, or may have a plurality of periods. Accordingly, it may be preferable to configure SPS based on the information transmission/reception period of the UE or the requirement of the higher layer. To this end, the UE may transmit UE assistance information to the BS.

For example, the UE may transfer, to the BS, UE assistance information which can be used when the BS determines the SPS configuration, and the UE may transmit the SPS configuration to the UE. Alternatively, a core network entity/MME/HSS/Vex service server/platform may transfer UE assistance information to the BS. The transmission of the UE assistance information may be triggered when assistance information indicated by the higher layer is received, a request for application V2X resources is made, and an SPS interval is changed. Hereinafter, the transmission of the UE assistance information from the UE to the BS through a Uu interface will be described. However, the present disclosure is not limited thereto. For example, the scope of the present disclosure may further include the transmission of the UE assistance information from the core network entity/MME/HSS/V2X service server/platform to the BS through an S1 interface.

The UE assistance information may be transmitted in various forms.

For example, the UE assistance information may be transmitted through an RRC message (for example, a UE information message or a V2X UE information message). Alternatively, the UE assistance information may be provided through MAC signaling (for example, a V2X BSR or an MAC CE having a new LCID value). Alternatively, the UE assistance information may be indicated through PHY signaling.

The UE assistance information may include various pieces of information that can be used for configuring SPS by the BS.

For example, UE assistance information related to the SPS configuration may include at least one piece of SPS interval information proposed by the UE, timing offset information proposed by the UE, V2X quality measurement information measured by the UE, V2X collision information measured by the UE, a V2X message received by the UE or a number of V2X UEs, a number of V2X messages transmitted by the UE, and an interval of a V2X message transmitted by the UE.

Meanwhile, the UE assistance information may be transmitted in at least one of the cases in which an estimated arrival period of a packet through V2X is changed and an estimated arrival offset of the packet through V2X is changed. Alternatively, the UE assistance information may be transmitted to the BS after or before SPS is configured.

Further, the UE may configure multiple SPSs by receiving a plurality of pieces of SPS configuration information. For example, the UE may configure uplink SPS processes of different intervals through a plurality of uplink SPS processes when SPS is configured. In this case, a plurality of pieces of SPS configuration information may include information on different SPS intervals as parameters. That is, the UE may configure a plurality of SPS intervals.

Meanwhile, the UE assistance information may be configured in the UE by the BS. For example, the UE may receive indication information for transmitting the configured UE assistance information to the BS from the BS, and the UE may configure the UE assistance information in the UE. Here, the configuring of the UE assistance information means storing and using information or a parameter related to the performance of a series of processes for, by the UE, generating the UE assistance information, identifying whether to trigger the UE assistance information, and transmitting the UE assistance information to the BS. That is, the UE may perform the operation of configuring transmission of the UE assistance information in the UE by using the indication information received from the BS and transmitting the configured UE assistance information under particular conditions.

In the related art, the UE performs sidelink communication on a subframe defined for a sidelink control period. The sidelink control period is a period at which resources allocated within a cell for sidelink control information and sidelink data transmission are generated. The UE transmits sidelink control information followed by sidelink data. The sidelink control information indicates a layer 1 ID and transmission characteristics.

The sidelink control period may have 40, 80, 160, and 320 subframes for FDD, and the sidelink control period may have 70, 140, 280, 60, 120, and 240 subframes for TDD according to TDD config.

Meanwhile, semi-persistent intervals have 10, 20, 32, 40, 64, 80, 128, 160, 320, and 640 subframes. Accordingly, when the configuration of the typical semi-persistent intervals is applied to V2X, the V2X scheduling allocation period and the semi-persistent interval configuration period may be different.

In order to prevent this, for example, the BS may indicate the semi-persistent interval period and the V2X control period, which are the same as each other, to the UE. For another example, the BS may indicate the semi-persistent interval period, which is a multiple of the V2X control period, to the UE. For further another example, the BS may indicate the semi-persistent interval period, which is proportional to an integer value of the V2X control period, to the UE. For still another example, the BS may indicate the semi-persistent interval period, which is inversely proportional to an integer value of the V2X control period (1/n, wherein n is an integer), to the UE. This may be equally applied to the V2X operation performed through the Pcell.

Meanwhile, when receiving resource allocation information (resource allocation release information) for SPS, the UE may transmit HARQ ACK information to the BS. At this time, the HARQ ACK may be transmitted through a cell for transmitting a PUCCH linked to the scheduling cell.

For another example, the UE may transmit information for making a request for releasing resource allocation for SPS to the BS. For example, when the UE successively transmits a predetermined number of MAC PDUs, which do not include an MACSDU, through V2X communication, or when the number of MAC PDUs to be transmitted through V2X communication is not larger than a predetermined number and thus the UE does not perform transmission, the UE may transfer information for making a request for releasing resource allocation for SPS to the BS. This may be transmitted through a cell for transmitting a PUCCH linked to the scheduling cell. The BS may transmit ACK information to the UE.

In the related art, an RRC_CONNECTED UE receiving a service by a cell within another carrier frequency may transmit Prose direct communication indication information to the serving cell when the UE desires to perform Prose direction communication. The indication information includes an intended Prose carrier. Specifically, in the Prose direct communication indication information, a sidelink UE information message may indicate a frequency for receiving sidelink communication by the UE, a frequency for transmitting sidelink communication by the UE, and destination information identified by a ProSe layer 2 group identifier.

Detailed information that the UE information message may include is shown in [Table 1] below.

TABLE 1

| commRxInterestedFreq |
|---|
| Indicates the frequency for the UE to receive sidelink communication |
| commTxResourceReq |
| Indicates the frequency for the UE to transmit sidelink communication as well as the sidelink communication transmission destination(s) for which the UE requests E-UTRAN to assign dedicated resources. |
| destinationInfoList |
| Indicates the destination which is identified by the ProSe Layer-2 Group ID as specified in TS 23.303 [68]. |

Meanwhile, as described above, the UE assistance information may be transferred to the BS in various forms. For example, the UE may add the UE assistance information to a V2X UE information field to transmit the UE assistance information. For another example, the UE may insert additional information for indicating V2X communication attributes into a V2X UE information message to transmit the additional information. For further another example, the UE may designate a particular field of the sidelink UE information field as a value mapped to the UE assistance information and transmit the same to the BS.

The BS may generate SPS configuration information based on the received UE assistance information and transmit the generated SPS configuration information to the UE.

As described above, the UE may perform V2X communication (or sidelink direct communication) with another UE using the V2X carrier. To this end, the BS should allocate resources for V2X communication to the UE, and the resource allocation may be performed as one of dynamic resource allocation through dynamic scheduling, autonomous resource allocation by which resources can be selected from pre-configured resources, and resource allocation through semi-persistent scheduling. However, it may be preferred to perform resource allocation through semi-persistent scheduling (SPS) in order to prevent control information from being unnecessary wasted and to intervene in resource allocation at a predetermined level.

In the case of resource allocation through the SPS configuration, the UE may generate and transmit UE assistance information to the BS for SPS suitable for the state of the UE, and a transmission type, a transmission time point, and information included in the UE assistance information have been described above in detail.

The following description will be made mainly based on semi-persistent scheduling proposed by the present disclosure among the resource allocation schemes. Particularly, the embodiment in which the UE and the BS configures SPS in the UE based on the UE assistance information will be described once more with reference to the drawings.

Figure 4:
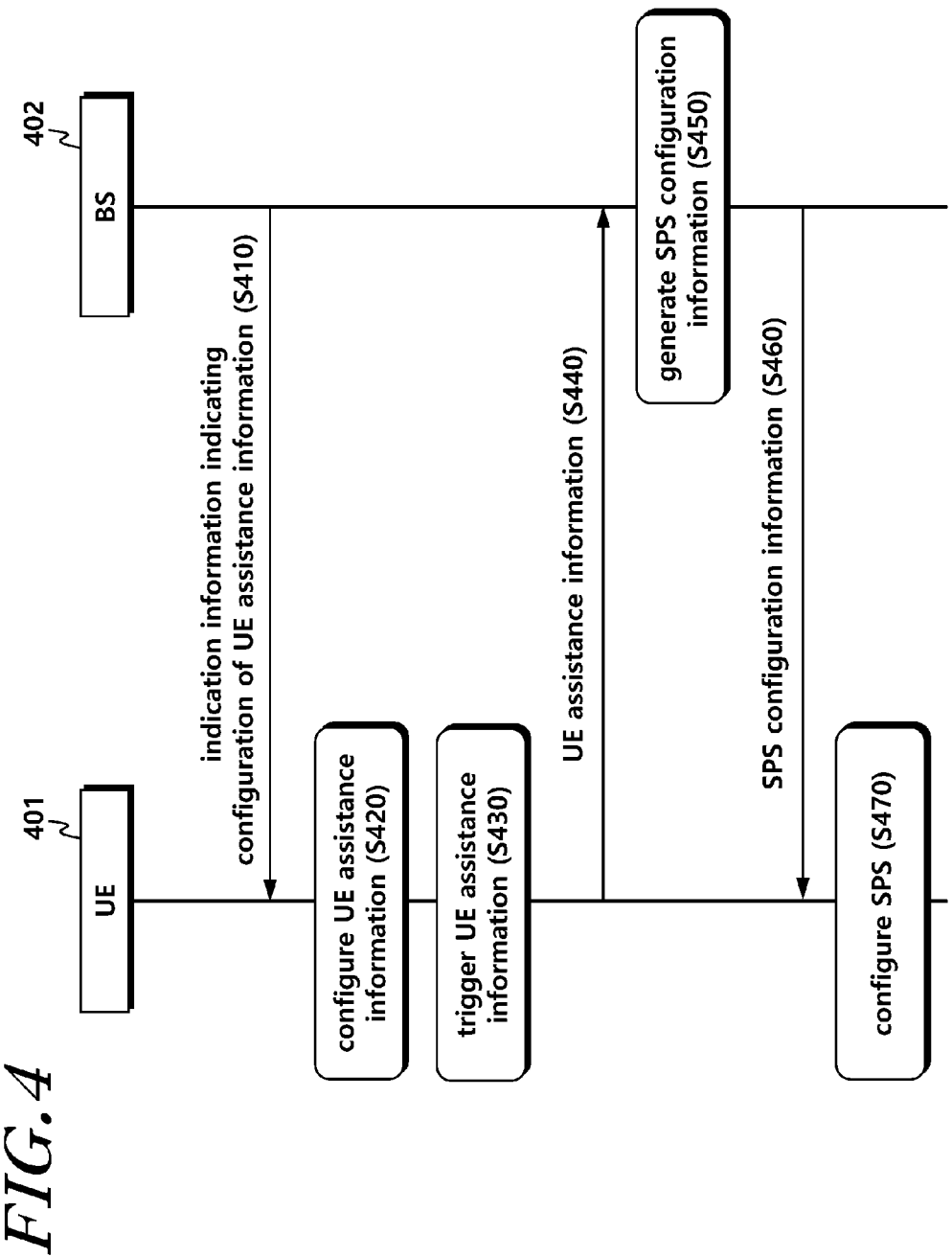
FIG. 4 is a signal flow diagram illustrating operations of a UE and a BS according to an embodiment.

FIG. 4 is a signal flow diagram illustrating an exemplary operation of a UE and a BS according to an embodiment.

Referring to FIG. 4, a BS 402 may transmit indication information instructing a UE 401 to configure UE assistance information to the UE 401 in S410. For example, the BS 402 may transmit indication information for allowing the UE 401 to generate UE assistance information and transfer the UE assistance information to the BS 402 under predetermined conditions.

The UE 401 may configure UE assistance information based on the indication information in S420. the configuring of the UE assistance information by the UE 401 may include setting, by the UE 401, the UE operation of generating the UE assistance information under predetermined conditions and transmitting the generated UE assistance information to the BS 401, that is, setting and configuring information included in the UE assistance information, a transmission type of the UE assistance information, or a transmission condition of the UE assistance information in the UE 401. Alternatively, the UE 402 may activate a UE assistance information transmission function or operation of the UE 401 by configuring the UE assistance information.

Thereafter, the UE 401 identifies whether transmission of the UE assistance information is triggered in S430. For example, the transmission of the UE assistance information may be triggered by at least one of i) receiving the UE assistance information from a higher layer of the UE 401, ii) making a request for allocating V2X resources, iii) changing an SPS interval, iv) changing an estimated arrival period of a data packet using V2X communication, and v) changing an estimated arrival offset of a data packet using V2X communication. In addition, triggering of the UE assistance information may be variously configured by settings.

When the transmission of the UE assistance information is triggered, the UE 401 generates UE assistance information and transmits the generated UE assistance information to the BS 402 in S440. For example, the UE assistance information may include at least one piece of SPS interval information proposed by the UE 401, timing offset information proposed by the UE 401, V2X quality measurement information measured by the UE 401, V2X collision information measured by the UE 401, information on the number of V2X messages received by the UE 401 and the number of UEs, information on the number of V2X messages transmitted by the UE 401, and V2X message interval information transmitted by the UE 401. That is, the UE assistance information may include V2X communication state information of the UE 401, proposed SPS configuration information, and the like.

The BS 402 may generate SPS configuration information configured in the UE 401 using the received UE assistance information in S450. For example, the BS 402 may identify each piece of information included in the UE assistance information and generate SPS configuration information suitable for performing V2X communication by the UE 401.

The BS 402 may transmit the generated SPS configuration information to the UE 401 in S460, and the UE 401 may configure SPS using the received SPS configuration information and perform V2X communication using allocated V2X communication radio resources in S470.

FIG. 4 illustrates the UE 401 transmitting the UE assistance information before SPS is configured in the UE. As described above, even when SPS is configured in the UE 401, the UE 401 may transmit the UE assistance information. Hereinafter, a procedure of configuring SPS will be described with reference to FIG. 5.

Figure 5:
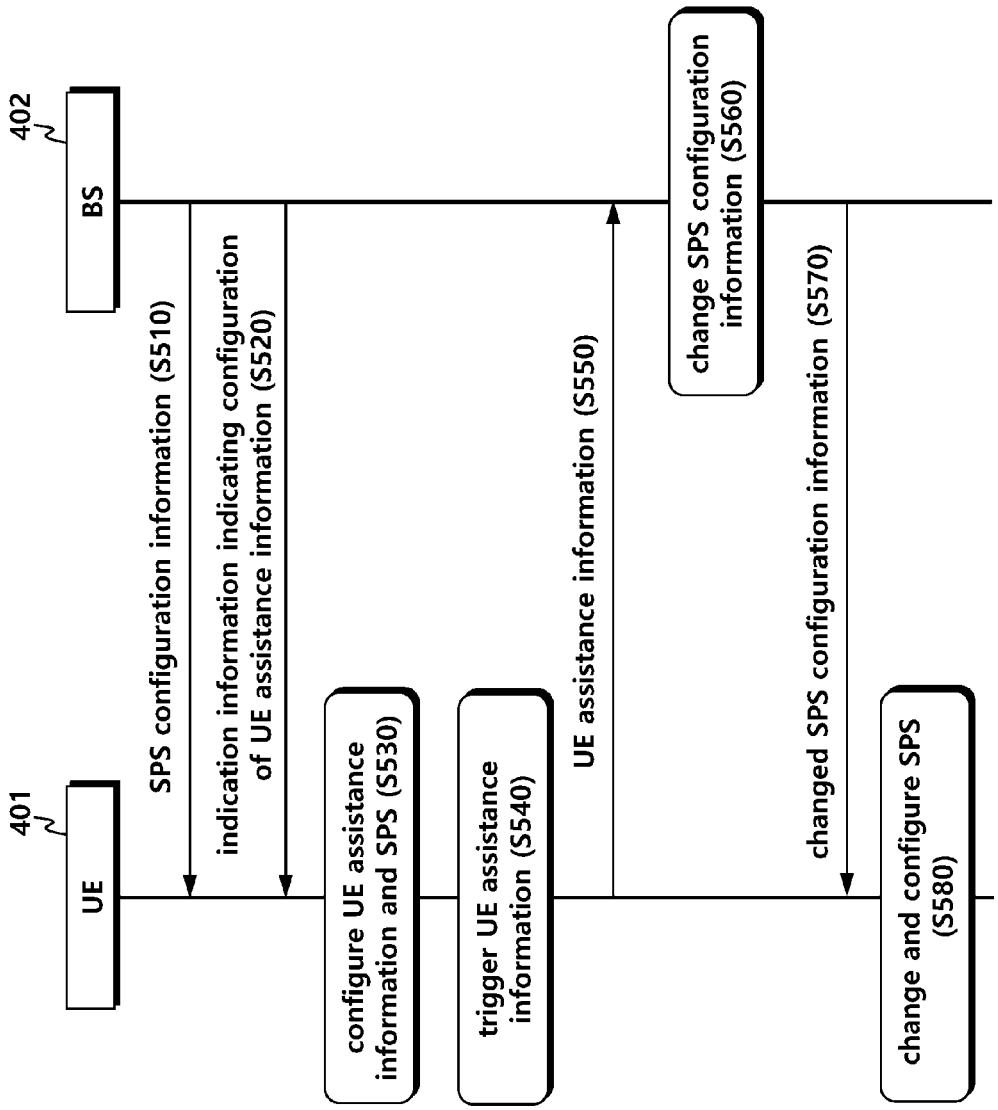
FIG. 5 is a signal flow diagram illustrating operations of a UE and a BS according to another embodiment.

FIG. 5 is a signal flow diagram illustrating an exemplary operation of a UE and a BS according to another embodiment.

Referring to FIG. 5, the BS 402 may transmit SPS configuration information to the UE 401 for V2X communication of the UE 401 in S510. The BS 402 may transmit indication information, indicating the configuration of UE assistance information, to the UE 401 as necessary in S520.

Thereafter, the UE 401 may configure SPS and UE assistance information based on the received SPS configuration information and indication information in S530. The indication information and the SPS configuration information may be simultaneously transmitted, or the indication information may be transmitted ahead of the SPS configuration information. That is, steps S510 and S520 may be combined or exchanged as necessary. Further, after step S510, the UE 401 may configure SPS and the indication information may be received after the UE 401 configures SPS.

The UE 401 identifies whether transmission of the UE assistance information is triggered in S540. For example, the transmission of the UE assistance information may be triggered by at least one of i) receiving the UE assistance information from a higher layer of the UE 401, ii) making a request for allocating V2X resources, iii) changing an SPS interval, iv) changing an estimated arrival period of a data packet using V2X communication, and v) changing an estimated arrival offset of a data packet using V2X communication. In addition, triggering of the UE assistance information may be variously configured by settings.

When the transmission of the UE assistance information is triggered, the UE 401 generates the UE assistance information and transmits the generated UE assistance information to the BS 402 in S550. For example, the UE assistance information may include at least one piece of SPS interval information proposed by the UE 401, timing offset information proposed by the UE 402, V2X quality measurement information measured by the UE 401, V2X collision information measured by the UE 401, information on the number of V2X messages received by the UE 401 and the number of UEs, information on the number of V2X messages transmitted by the UE 401, and V2X message interval information transmitted by the UE 401. That is, the UE assistance information may include V2X communication state information of the UE 401, proposed SPS configuration information, and the like.

The BS 402 may change SPS configuration information to be configured in the UE 401 based on the received UE assistance information in S560. For example, the BS 402 may identify each piece of information included in the UE assistance information and generate SPS configuration information that is changed to be suitable for V2X communication of the UE 401.

The BS 402 may transmit the changed SPS configuration information to the UE 401 in S570, and the UE 401 may change and configure SPS using the received SPS configuration information and perform V2X communication using allocated V2X communication radio resources in S580.

Hereinafter, operations of the UE and the BS for configuring SPS based on the UE configuration information will be described separately according to entities that configure SPS.

Figure 6:
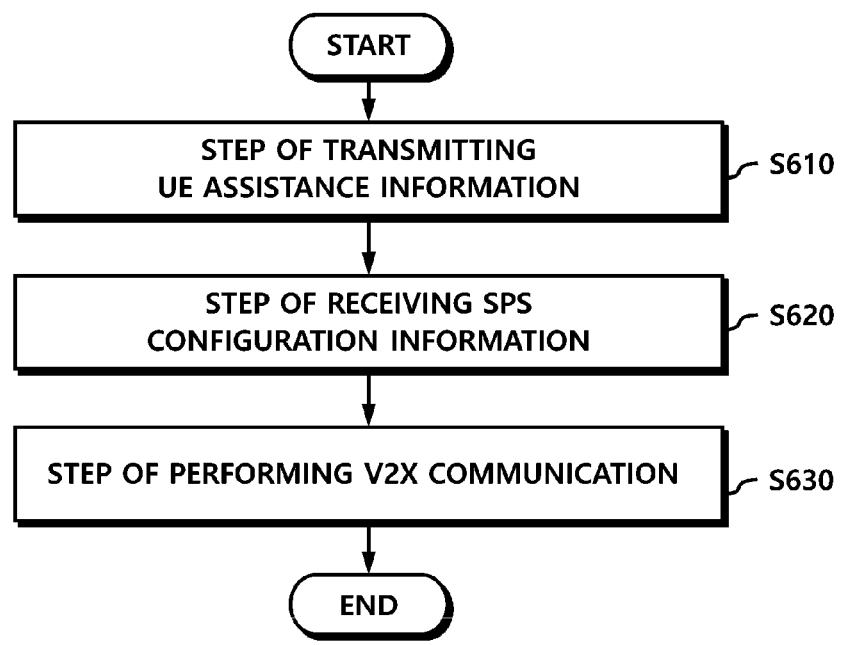
FIG. 6 is a flowchart illustrating operations of a UE according to an embodiment.

FIG. 6 is a flowchart illustrating operations of a UE according to an embodiment.

Referring to FIG. 6, the UE performing Vehicle-to-Everything (V2X) communication may transmit UE assistance information for Semi-Persistent Scheduling (SPS) of V2X communication radio resources to the BS in S610. For example, when resource allocation for V2X communication is performed through an SPS scheme, the UE may transmit, to the BS, UE assistance information to be used for generating SPS configuration information.

For example, the UE assistance information may include at least one piece of SPS interval information proposed by the UE, timing offset information proposed by the UE, V2X quality measurement information measured by the UE, V2X collision information measured by the UE, information on the number of V2X messages received by the UE or the number of UEs, information on the number of V2X messages transmitted by the UE, and V2X message interval information transmitted by the UE. That is, the UE assistance information may include V2X communication state information of the UE and proposed SPS configuration information.

Further, the UE assistance information may be transmitted through one of an RRC message, MAC signaling, and physical-layer signaling. For example, the UE assistance information may be transferred to the BS through a UE information message, a V2X UE information message, and a V2X BSR.

Meanwhile, when transmission of the UE assistance information is triggered, the UE may transmit the UE assistance information to the BS. For example, the transmission of the UE assistance information may be triggered and transmitted upon the generation of at least one of events including i) receiving the UE assistance information from a higher layer of the UE, ii) making a request for allocating V2X resources, iii) changing an SPS interval, iv) changing an estimated arrival period of a data packet using V2X communication, and v) changing an estimated arrival offset of a data packet using V2X communication.

Further, the UE assistance information may be transmitted before or after the UE configures SPS therein. That is, the UE assistance information may be transmitted both before and after SPS is configured. Further, multiple SPS may be configured in the UE, in which case the UE assistance information may be configured for each SPS and transmitted to the BS.

The UE may transmit the UE assistance information by receiving indication information instructing the UE to configure the UE assistance information from the BS.

The UE may receive the generated SPS configuration information based on the UE assistance information from the BS in S620. The UE may receive the SPS configuration information from the BS, and the SPS configuration information may be information generated by the BS based on the UE assistance information transmitted from the UE. For example, the BS may identify each piece of information included in the UE assistance information and generate SPS configuration information suitable for V2X communication of the UE.

The number of pieces of SPS configuration information may be two or more. When the number of pieces of SPS information is plural, respective pieces of SPS configuration information may have different parameter values. For example, two or more pieces of SPS configuration information may include information on different SPS intervals as parameters.

The UE may conduct V2X communication based on the SPS configuration information in S630. The UE may configure SPS therein based on the received SPS configuration information and perform V2X communication with another UE through V2X communication radio resources allocated according to the configured SPS.

Meanwhile, as described above, the UE may transmit UE assistance information to the BS even after the SPS is configured. In this case, the UE may additionally receive SPS configuration information that is changed by the BS based on the UE assistance information and configure SPS again based on the additionally received SPS configuration information in the UE.

Figure 7:
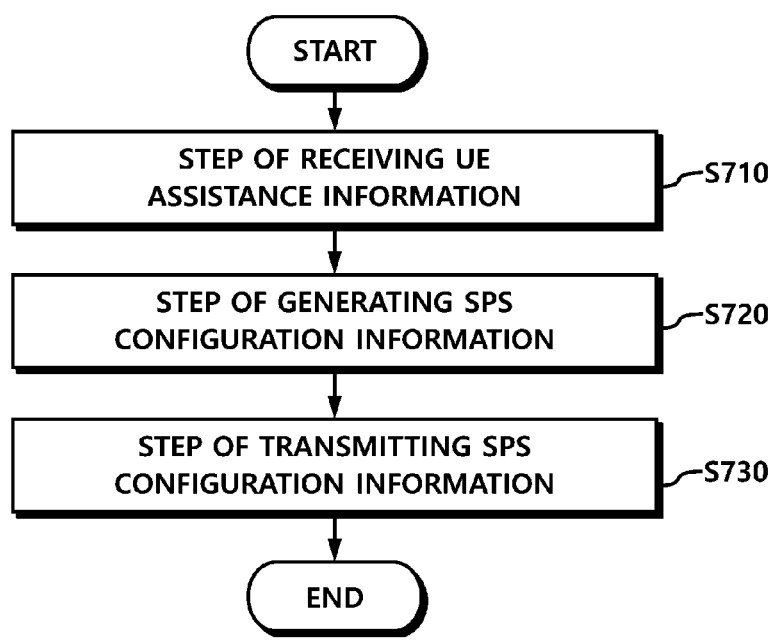
FIG. 7 is a flowchart illustrating operations of a BS according to an embodiment.

FIG. 7 is a flowchart illustrating operation of a BS according to an embodiment.

Referring to FIG. 7, the BS controlling Vehicle-to-Everything (V2X) communication of the UE may receive UE assistance information for Semi-Persistent Scheduling (SPS) of V2X communication radio resources from the UE in S710. For example, the UE assistance information may include at least one piece of SPS interval information proposed by the UE, timing offset information proposed by the UE, V2X quality measurement information measured by the UE, V2X collision information measured by the UE, information on the number of V2X messages received by the UE or the number of UEs, information on the number of V2X messages transmitted by the UE, and V2X message interval information transmitted by the UE. That is, the UE assistance information may include V2X communication state information of the UE and proposed SPS configuration information.

Further, the UE assistance information may be received through one of an RRC message, MAC signaling, and physical-layer signaling. For example, the UE assistance information may be received by the BS through a UE information message, a V2X UE information message, or a V2X BSR.

Meanwhile, when transmission of the UE assistance information is triggered, the BS may receive the UE assistance information. For example, the transmission of the UE assistance information may be triggered and the UE assistance information may be transmitted in response to at least one of events including i) receiving the UE assistance information from a higher layer of the UE, ii) making a request for allocating V2X resources, iii) changing an SPS interval, iv) changing an estimated arrival period of a data packet using V2X communication, and v) changing an estimated arrival offset of a data packet using V2X communication, in which case the BS may receive the UE assistance information.

Further, the UE assistance information may be received before or after the BS configures SPS in the UE. That is, the UE assistance information may be received both before and after SPS is configured in the UE. Further, multiple SPS may be configured in the UE. In this case, the UE assistance information may be configured for each SPS and received.

The BS may further transmit indication information for configuring transmission of the UE assistance information to the UE. The UE may configure the UE assistance information based on the indication information and transmit the UE assistance information to the BS according to the configured information.

The BS may generate SPS configuration information for V2X communication of the UE based on the UE assistance information in S720. The BS may generate SPS configuration information of the corresponding UE based on the received UE assistance information. The number of pieces of generated SPS configuration information may be plural. When the UE assistance information is received after SPS is configured in the UE, the BS may generate SPS configuration information for changing SPS of the corresponding UE based on the received UE assistance information.

The BS may transmit the SPS configuration information to the UE in S730. The BS may transmit the generated or changed SPS configuration information to the UE. The SPS configuration information may be transmitted to the UE through physical-layer signaling or higher-layer signaling.

According to the present embodiments described above, sidelink-based V2X communication may be effectively provided using V2X communication-dedicated carriers, and unnecessary usage of radio resources may be prevented by radio resource scheduling for V2Xcommunication, and radio resource scheduling may be effectively performed.

Hereinafter, hardware configuration of a UE and a BS will be briefly described.

Figure 8:
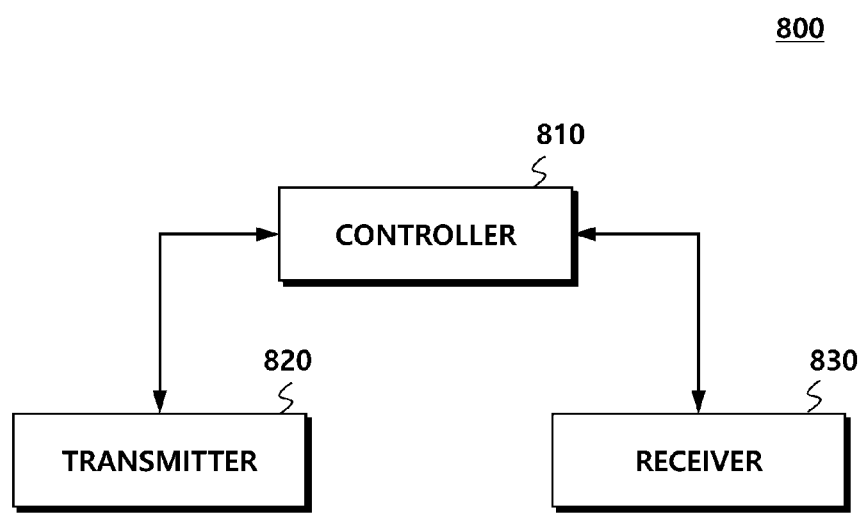
FIG. 8 illustrates a UE according to an embodiment.

FIG. 8 illustrates a UE according to an embodiment.

Referring to FIG. 8, a UE 800 performing Vehicle-to-Everything (V2X) communication may include a transmitter 820 configured to transmit UE assistance information for Semi-Persistent Scheduling (SPS) of V2X communication radio resources to the BS, a receiver 830 configured to receive SPS configuration information generated using the UE assistance information from the BS, and a controller 810 configured to perform V2X communication based on the SPS configuration information.

The receiver 830 may also receive indication information for configuring transmission of the UE assistance information from the BS. The receiver 830 may receive a plurality of pieces of SPS configuration information.

The controller 810 controls the overall operation of the UE 800 required for performing V2X communication by generating UE assistance information, identifying whether transmission of the UE assistance information is triggered, transmitting the UE assistance information to the BS, and configuring SPS using the SPS configuration information generated and received based on the UE assistance information. For example, the UE assistance information may include at least one piece of SPS interval information proposed by the UE, timing offset information proposed by the UE, V2X quality measurement information measured by the UE, V2X collision information measured by the UE, information on the number of V2X messages received by the UE or the number of UEs, information on the number of V2X messages transmitted by the UE, and V2X message interval information transmitted by the UE. That is, the UE assistance information may include V2X communication state information of the UE and proposed SPS configuration information. Further, the generation and transmission of the UE assistance information may be triggered in response to at least one of events including i) receiving the UE assistance information from a higher layer of the UE, ii) making a request for allocating V2X resources, iii) changing an SPS interval, iv) changing an estimated arrival period of a data packet using V2X communication, and v) changing an estimated arrival offset of a data packet using V2X communication.

Meanwhile, when a plurality of SPS is configured in the UE, the transmitter 820 may transmit UE assistance information for each SPS configuration to the BS as necessary. The transmitter 820 may transmit the UE assistance information through one of an RRC message, MAC signaling and physical-layer signaling. For example, the UE assistance information may be transferred to the BS through a UE information message, a V2X UE information message, and a V2X BSR.

In addition, the receiver 830 may receive downlink control information, data, and messages from the BS through a corresponding channel and receive data and signals from another UE through V2X communication. The transmitter 820 may transmit uplink control information, data, and messages to the BS through a corresponding channel and transmit data and signals to another UE through V2X communication.

Figure 9:
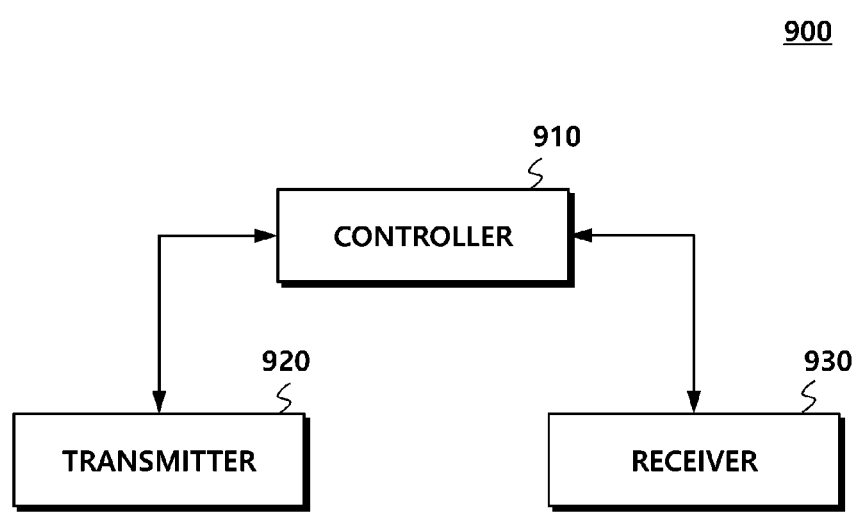
FIG. 9 illustrates a BS according to an embodiment.

FIG. 9 illustrates a BS according to an embodiment.

Referring to FIG. 9, a BS 900 controlling Vehicle-to-Everything (V2X) communication of the UE may include a receiver 930 configured to receive UE assistance information for Semi-Persistent Scheduling (SPS) of V2X communication radio resources from the UE, a controller 910 configured to generate SPS configuration information for V2X communication of the UE based on the UE assistance information, and a transmitter 920 configured to transmit the SPS configuration information to the UE.

The transmitter 920 may also transmit indication information for configuring transmission of the UE assistance information to the UE. The transmitter 920 may transmit a plurality of pieces of SPS configuration information.

Further, the controller 910 may control the overall operation of the BS 900 required for indicating resource allocation for V2X communication of the UE by generating SPS configuration information based on the UE assistance information and transmitting the generated SPS configuration information to the UE.

Meanwhile, the UE assistance information may include at least one piece of SPS interval information proposed by the UE, timing offset information proposed by the UE, V2X quality measurement information measured by the UE, V2X collision information measured by the UE, information on the number of V2X messages received by the UE or the number of UEs, information on the number of V2X messages transmitted by the UE, and V2X message interval information transmitted by the UE. That is, the UE assistance information may include V2X communication state information of the UE and proposed SPS configuration information. Further, the generation and transmission of the UE assistance information may be triggered in response to at least one of events including i) receiving the UE assistance information from a higher layer of the UE, ii) making a request for allocating V2X resources, iii) changing an SPS interval, iv) changing an estimated arrival period of a data packet using V2X communication, and v) changing an estimated arrival offset of a data packet using V2X communication is changed, and the BS may receive the UE assistance information.

Meanwhile, when a plurality of SPS is configured in the UE, the receiver 930 may receive UE assistance information for each SPS configuration as necessary. Further, the receiver 930 may receive the UE assistance information through one of an RRC message, MAC signaling, and physical-layer signaling. For example, the UE assistance information may be received through a UE information message, a V2X UE information message, and a V2X BSR.

In addition, the transmitter 920 and the receiver 930 may be used for transmitting/receiving signals, messages, and data required for implementing the present embodiments to/from the UE.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

The invention claimed is:

1. A method of performing Vehicle-to-Everything (V2X) communication by a User Equipment (UE), the method comprising:
   transmitting UE assistance information for Semi-Persistent Scheduling (SPS) of V2X communication radio resources to a Base Station (BS);
   receiving, from the BS, SPS configuration information generated by the BS based on the UE assistance information; and
   performing the V2X communication based on the SPS configuration information,
   wherein the UE assistance information is transmitted in response to at least one of events including i) changing an estimated arrival period of a packet using the V2X communication and ii) changing an estimated arrival offset of the packet, and wherein the UE assistance information includes SPS interval information and timing offset information proposed by the UE.

2. The method of claim 1, wherein, when a number of pieces of SPS configuration information is two or more, the two or more pieces of SPS configuration information include different pieces of SPS interval information as parameters.

3. The method of claim 1, wherein:
the UE assistance information is configured by the UE based on indication information received from the BS and transmitted to the BS; and
the UE assistance information is transmitted when the SPS is configured by the UE.

4. A method of controlling Vehicle-to-Everything (V2X) communication of a User Equipment (UE) by a Base Station (BS), the method comprising:
receiving UE assistance information for Semi-Persistent Scheduling (SPS) of V2X communication radio resources;
generating SPS configuration information for the V2X communication of the UE based on the UE assistance information; and
transmitting the SPS configuration information to the UE,
wherein the UE assistance information is transmitted from the UE and received by the BS in response to at least one of events including changing an estimated arrival period of a packet using the V2X communication and changing an estimated arrival offset of the packet, and
wherein the UE assistance information includes SPS interval information and timing offset information proposed by the UE.

5. The method of claim 4, wherein, when a number of pieces of SPS configuration information is two or more, the two or more pieces of SPS configuration information include different pieces of SPS interval information as parameters.

6. The method of claim 4, wherein:
the UE assistance information is configured by the UE based on indication information transmitted from the BS, and the UE assistance information is received by the BS when the SPS is configured by the UE.

7. A User Equipment (UE) performing Vehicle-to-Everything (V2X) communication, the UE comprising:
a transmitter configured to transmit UE assistance information for Semi-Persistent Scheduling (SPS) of V2X communication radio resources to a Base Station (BS);
a receiver configured to receive SPS configuration information generated using the UE assistance information from the BS; and
a controller configured to perform the V2X communication based on the SPS configuration information,
wherein the UE assistance information is transmitted in response to at least one of events including changing an estimated arrival period of a packet using the V2X communication and changing an estimated arrival offset of the packet, and
wherein the UE assistance information includes at least one piece of SPS interval information and timing offset information proposed by the UE.

8. The UE of claim 7, wherein, when a number of pieces of SPS configuration information is two or more, the two or more pieces of SPS configuration information include different pieces of SPS interval information as parameters.

9. The UE of claim 7, wherein:
the UE assistance information is configured by the UE based on indication information received from the BS and transmitted to the BS; and
the UE assistance information is transmitted when the SPS is configured by the UE.

* * * * *